(12) United States Patent
Eastwood et al.

(10) Patent No.: US 10,774,685 B2
(45) Date of Patent: Sep. 15, 2020

(54) GAS TURBINE ENGINE EXHAUST COMPONENT

(71) Applicant: United Technologies Corporation, Farmington, CT (US)

(72) Inventors: Jonathan Jeffery Eastwood, West Hartford, CT (US); Adam Lee Hart, Stuart, FL (US); Brian Craig, Palm Beach Gardens, FL (US); Luis Miguel Ayalde, Weston, FL (US); Brian Levy, Sunny Isles Beach, FL (US)

(73) Assignee: RATHEON TECHNOLOGIES CORPORATION, Farmington, CT (US)

( * ) Notice: Subject to any disclaimer, the term of this patent is extended or adjusted under 35 U.S.C. 154(b) by 123 days.

(21) Appl. No.: 15/966,760

(22) Filed: Apr. 30, 2018

(65) Prior Publication Data

US 2019/0331002 A1 Oct. 31, 2019

(51) Int. Cl.
| | |
|---|---|
| *F01D 25/24* | (2006.01) |
| *F01D 9/04* | (2006.01) |
| *F02C 3/04* | (2006.01) |
| *F02K 1/52* | (2006.01) |
| *F02K 1/44* | (2006.01) |
| *F02K 1/40* | (2006.01) |

(Continued)

(52) U.S. Cl.
CPC ............ *F01D 25/243* (2013.01); *B64D 33/04* (2013.01); *F01D 9/04* (2013.01); *F01D 25/246* (2013.01); *F02C 3/04* (2013.01); *F02K 1/40* (2013.01); *F02K 1/44* (2013.01); *F02K 1/52* (2013.01); *F01D 25/30* (2013.01); *F05D 2220/323* (2013.01); *F05D 2220/76* (2013.01); *F05D 2240/15* (2013.01)

(58) Field of Classification Search
CPC .......... F01D 25/30; F01D 25/243; F02K 1/40; F02K 1/44; F02K 1/52; B64D 33/04; F05D 2240/15
See application file for complete search history.

(56) References Cited

U.S. PATENT DOCUMENTS

| | | | | |
|---|---|---|---|---|
| 2,710,503 A | * | 6/1955 | Boyd ...................... | F01D 9/023 60/39.37 |
| 2,799,472 A | * | 7/1957 | Rainbow .................. | F02K 1/04 415/136 |

(Continued)

FOREIGN PATENT DOCUMENTS

| | | |
|---|---|---|
| CA | 2810028 | 9/2013 |
| EP | 1930556 | 6/2008 |
| WO | 2016198806 | 12/2016 |

OTHER PUBLICATIONS

European Search Report for EP Application No. 19172047.3 dated Aug. 30, 2019.

*Primary Examiner* — Gerald L Sung
*Assistant Examiner* — Marc J Amar
(74) *Attorney, Agent, or Firm* — Carlson, Gaskey & Olds, P.C.

(57) ABSTRACT

A heat shield for a gas turbine engine includes a radial heat shield flange that extends in a circumferential direction and forms a ring. A plurality of bosses extend from a first axial side of the radial heat shield flange. There is a plurality of guide pins. One of the plurality of guide pins extends from a corresponding one of the plurality of bosses.

15 Claims, 6 Drawing Sheets

(51) Int. Cl.
*B64D 33/04* (2006.01)
*F01D 25/30* (2006.01)

(56) References Cited

U.S. PATENT DOCUMENTS

| | | | | |
|---|---|---|---|---|
| 3,387,820 A | * | 6/1968 | Smith | F01D 25/243 |
| | | | | 415/213.1 |
| 3,744,242 A | * | 7/1973 | Stettler | F23R 3/02 |
| | | | | 60/39.23 |
| 4,190,397 A | * | 2/1980 | Schilling | F01D 25/243 |
| | | | | 415/108 |
| 4,887,949 A | * | 12/1989 | Dimmick, III | F01D 5/066 |
| | | | | 411/121 |
| 4,989,406 A | * | 2/1991 | Vdoviak | F01D 25/162 |
| | | | | 244/117 A |
| 5,226,788 A | * | 7/1993 | Fledderjohn | F01D 5/066 |
| | | | | 411/84 |
| 5,230,214 A | * | 7/1993 | Pechette | F02K 1/04 |
| | | | | 60/725 |
| 5,385,015 A | * | 1/1995 | Clements | F23R 3/20 |
| | | | | 60/39.826 |
| 6,449,952 B1 | * | 9/2002 | Emilianowicz | F01D 25/243 |
| | | | | 60/752 |
| 9,845,695 B2 | | 12/2017 | Budnick et al. | |
| 9,903,216 B2 | | 2/2018 | Chuong et al. | |
| 2003/0118399 A1 | * | 6/2003 | Schilling | F16B 5/0275 |
| | | | | 403/337 |
| 2010/0011780 A1 | * | 1/2010 | Varney | F01D 25/243 |
| | | | | 60/796 |
| 2010/0316484 A1 | * | 12/2010 | Jasko | F01D 9/041 |
| | | | | 415/1 |
| 2012/0240583 A1 | * | 9/2012 | Penz | F23R 3/002 |
| | | | | 60/722 |
| 2012/0257958 A1 | * | 10/2012 | Norton | F04D 29/644 |
| | | | | 415/108 |
| 2012/0321451 A1 | * | 12/2012 | Xiao | F01D 9/041 |
| | | | | 415/180 |
| 2013/0011253 A1 | * | 1/2013 | Mulcaire | F01D 25/243 |
| | | | | 415/214.1 |
| 2013/0017082 A1 | * | 1/2013 | Casavant | F01D 25/285 |
| | | | | 415/213.1 |
| 2013/0183118 A1 | * | 7/2013 | Cooper | F16B 39/101 |
| | | | | 411/337 |
| 2013/0202430 A1 | * | 8/2013 | Gaudry | F02C 7/32 |
| | | | | 415/214.1 |
| 2013/0255276 A1 | * | 10/2013 | Jorgensen | F02C 7/20 |
| | | | | 60/796 |
| 2014/0069106 A1 | * | 3/2014 | Preston, III | F02K 1/822 |
| | | | | 60/796 |
| 2014/0193252 A1 | * | 7/2014 | Seale | F01D 25/243 |
| | | | | 415/213.1 |
| 2014/0286770 A1 | * | 9/2014 | Henry | F01D 5/026 |
| | | | | 415/213.1 |
| 2015/0040393 A1 | | 2/2015 | Shteyman | |
| 2015/0292356 A1 | | 10/2015 | Yeager et al. | |
| 2015/0354384 A1 | * | 12/2015 | Budnick | F01D 11/005 |
| | | | | 415/111 |
| 2016/0003161 A1 | * | 1/2016 | Grogg | F01D 25/162 |
| | | | | 415/177 |
| 2016/0169049 A1 | * | 6/2016 | Eastwood | F01D 25/28 |
| | | | | 60/751 |
| 2016/0230604 A1 | * | 8/2016 | Light | F01D 25/30 |
| 2016/0237854 A1 | * | 8/2016 | Grant | F02C 3/10 |
| 2016/0290360 A1 | * | 10/2016 | Tanaka | F01D 25/243 |
| 2016/0363004 A1 | * | 12/2016 | Chow | F01D 25/145 |
| 2017/0030223 A1 | * | 2/2017 | Parry | F01D 25/243 |
| 2017/0108009 A1 | * | 4/2017 | Obereich | F01D 5/027 |
| 2017/0146018 A1 | * | 5/2017 | Chow | F04D 19/002 |
| 2017/0167282 A1 | * | 6/2017 | Kloetzer | F01D 11/003 |
| 2017/0227152 A1 | * | 8/2017 | Tyburcy | F02C 7/32 |
| 2018/0080345 A1 | * | 3/2018 | Debray | F04D 29/526 |
| 2018/0112557 A1 | * | 4/2018 | Kappes | F01D 25/162 |
| | | | | 244/117 A |
| 2019/0301302 A1 | * | 10/2019 | Eastwood | F01D 25/18 |
| 2019/0309764 A1 | * | 10/2019 | Chow | F04D 29/526 |

* cited by examiner

GAS TURBINE ENGINE EXHAUST COMPONENT

STATEMENT REGARDING FEDERALLY SPONSORED RESEARCH OR DEVELOPMENT

This invention was made with Government support under Contract No. W58RGZ-16-C-0046, awarded by the United States Army. The Government has certain rights in this invention.

BACKGROUND

This application relates to engine cases, and more particularly to a heat shield attached to an engine case.

A gas turbine engine typically includes a fan section, a compressor section, a combustor section and a turbine section. Alternatively, the gas turbine engine could be land based and drive another component, such as a generator, instead of a fan section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Gas turbine engines typically include a turbine exhaust case that guides exhaust flow from the turbine section. The turbine exhaust case can have two rings defining inner and outer boundaries to guide the exhaust flow exiting the engine. The rings can be interconnected by struts to support the inner ring. A heat shield is used to shield a bearing compartment from the hot gases in the exhaust flow.

SUMMARY

In one exemplary embodiment, a heat shield for a gas turbine engine includes a radial heat shield flange that extends in a circumferential direction and forms a ring. A plurality of bosses extend from a first axial side of the radial heat shield flange. There is a plurality of guide pins. One of the plurality of guide pins extends from a corresponding one of the plurality of bosses.

In a further embodiment of the above, an axial heat shield flange extends axially from a radially outer edge of the radial heat shield flange. At least one of the plurality of bosses extends from the radial heat shield flange and the axial heat shield flange.

In a further embodiment of any of the above, the plurality of bosses are formed integrally with the heat shield.

In a further embodiment of any of the above, a conical portion extends radially inward from a radially inner edge of the radial heat shield flange.

In a further embodiment of any of the above, a plateau that forms a disk is located radially inward from the conical portion.

In a further embodiment of any of the above, the radial heat shield ring includes a plurality of exhaust case fastener openings.

In a further embodiment of any of the above, the guide pin includes a first threaded portion for engaging the corresponding one of the plurality of bosses. A second threaded portion is on an opposite end of the guide pin from the first threaded portion.

In a further embodiment of any of the above, the radial heat shield flange includes a second axial side that has a radially inner ring contact surface.

In a further embodiment of any of the above, each of the plurality of guide pins extend in an axial direction.

In another exemplary embodiment, a gas turbine engine includes a core engine that is configured to rotate an output shaft and compress and communicate the airflow from a core flow path into a combustor section for expansion through a turbine section. A case includes a radially outer ring and a radially inner ring connected by a plurality of circumferentially spaced apart struts and defines an annular flow path therebetween. The radially inner ring including a radial ring flange that extends in a radial direction from the inner ring. A heat shield is attached to the radial ring flange. The heat shield includes a radial heat shield flange that extends in a radial direction and a plurality of bosses that extend from the heat shield for accepting a corresponding one of a plurality of guide pins.

In a further embodiment of any of the above, the heat shield includes an axially extending flange that is located on a radially outer edge of the radially extending heat shield flange.

In a further embodiment of any of the above, the axial heat shield flange extends in a direction away from the radial ring flange.

In a further embodiment of any of the above, at least one of the plurality of bosses extends from the radial heat shield flange and the axial heat shield flange.

In a further embodiment of any of the above, the axial heat shield flange directly contacts the radially inner ring.

In a further embodiment of any of the above, the radially extending ring flange includes a plurality of inner ring fastener openings that align with a corresponding heat shield fastener opening in the radially extending heat shield flange.

In a further embodiment of any of the above, the radially extending ring flange includes a surface that directly contacts a surface on the radially extending heat shield flange.

In a further embodiment of any of the above, the radially extending ring flange extends in a first radial direction. The radially extending heat shield flange extends in a second radial direction opposite the first radial direction.

In a further embodiment of any of the above, each of the plurality of guide pins are located axially downstream of the radially extending ring flange.

In a further embodiment of any of the above, each of the plurality of guide pins are located on an opposite side of the radially extending heat shield flange from the radially extending ring flange.

DETAILED DESCRIPTION

Figure 1:
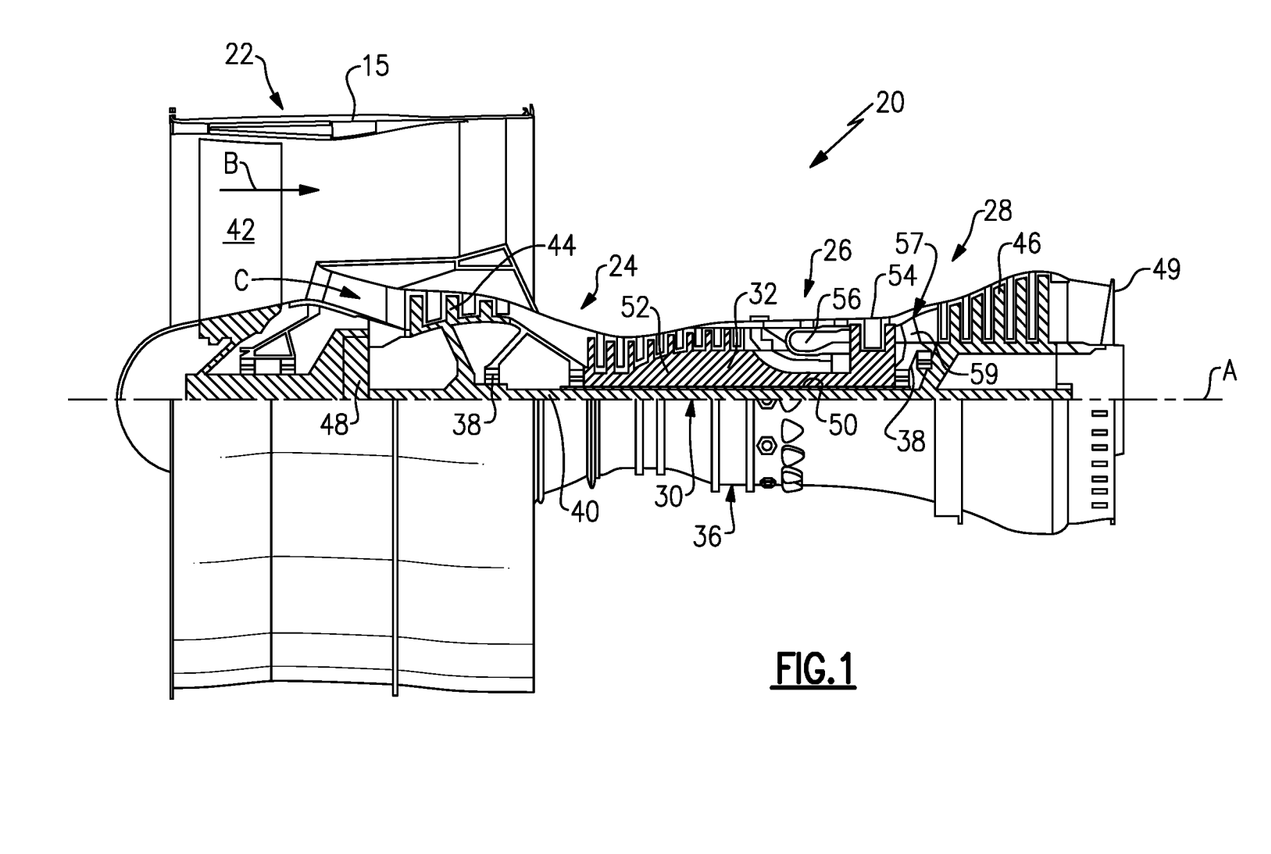
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Figure 2:
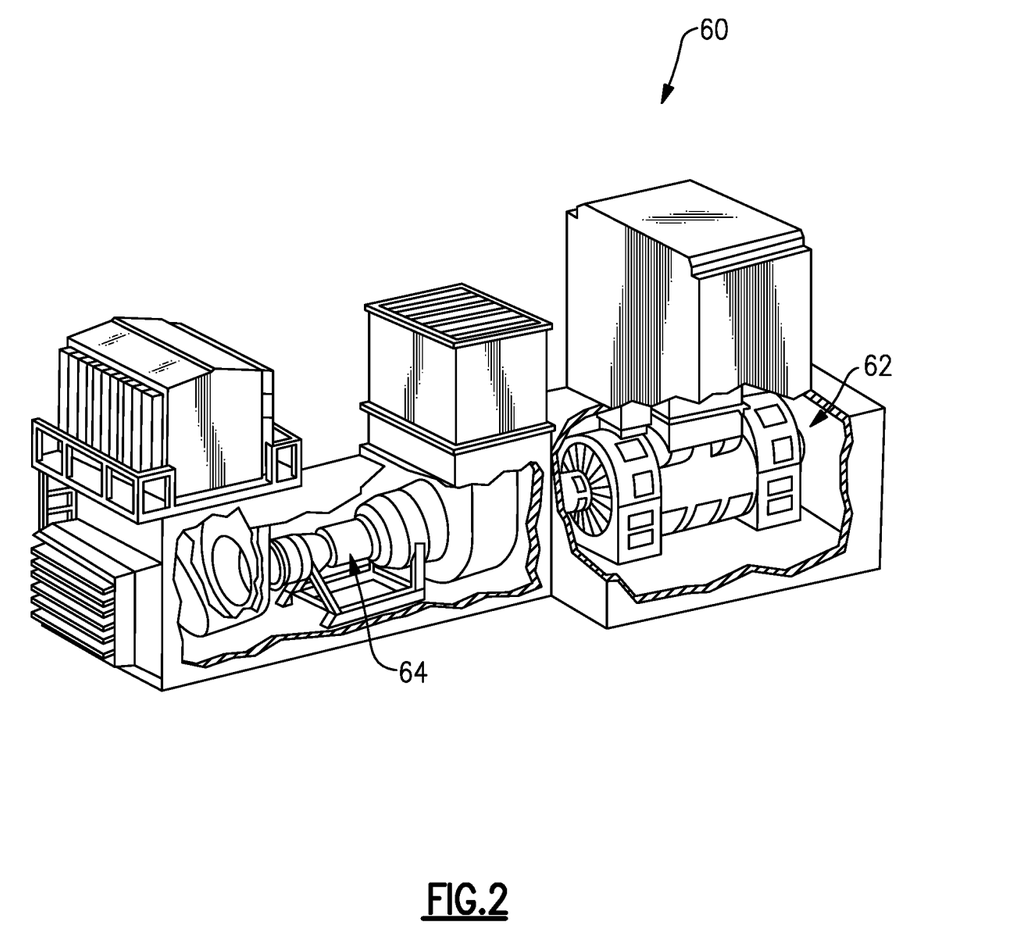
FIG. 2 is a schematic view of an example power turbine.

Referring now to FIG. 2, an example industrial gas turbine engine assembly 60 includes a gas turbine engine 62 that is mounted to a structural land-based frame to drive a generator 64. The example gas turbine engine 62 includes many of the same features described in the gas turbine engine 20 illustrated in FIG. 1 and operates in much the same way. The land-based industrial gas turbine engine 62, however, may include additional features such as a shaft to drive the generator 64 and is not constrained by the same weight restrictions that apply to an aircraft mounted gas turbine engine 20. In addition, the example gas turbine engine 62 does not include a fan.

Figure 3:
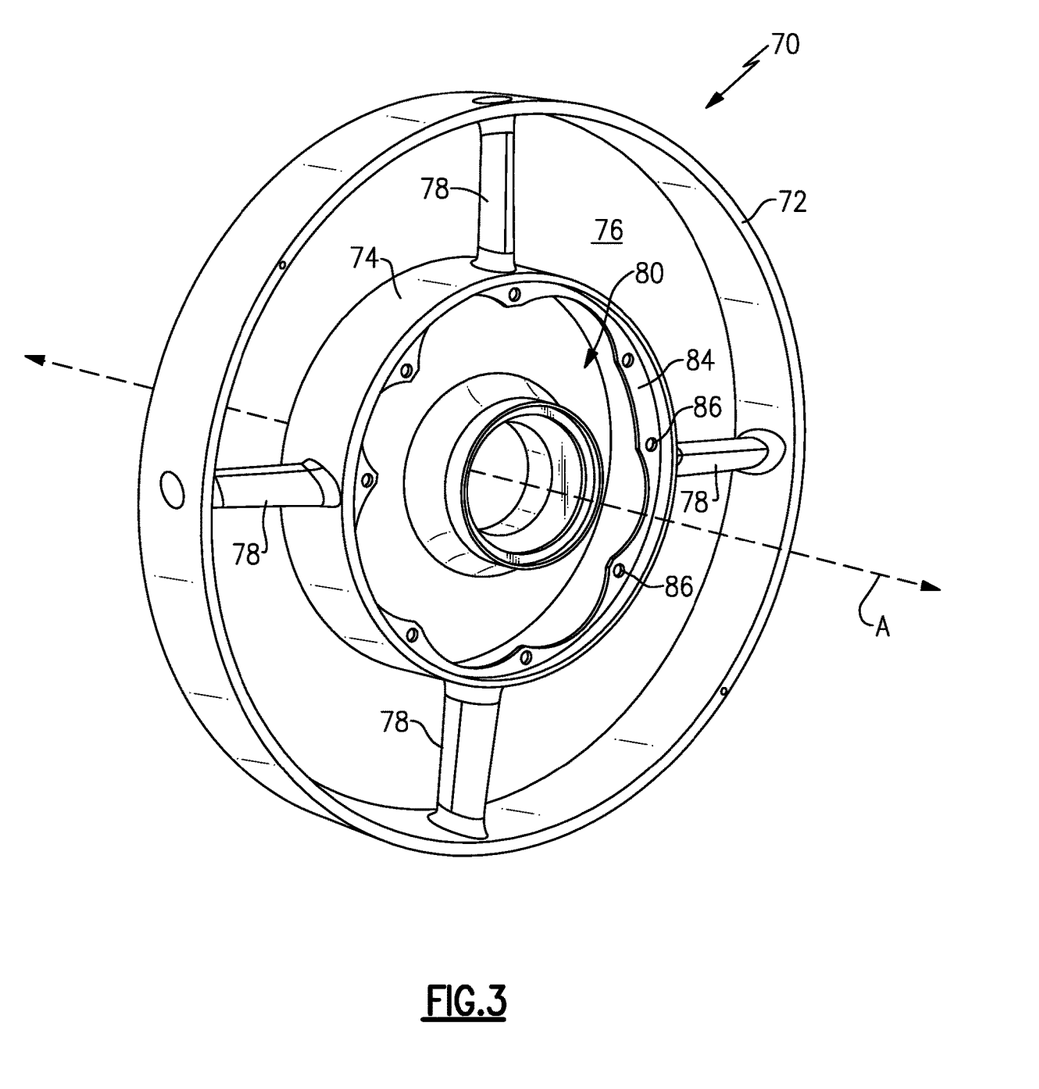
FIG. 3 is a perspective view of an example exhaust case.

FIG. 3 is a schematic perspective view of a downstream side of an example case 70 for either the gas turbine engine 20 or the gas turbine engine 62. In the illustrated embodiment, the case 70 forms at least a portion of the turbine exhaust case 49 in FIG. 1.

The case 70 includes a radially outer ring 72 extending at least partially about a radially inner ring 74. The rings 72, 74 define an annular flow path 76 for accepting a portion of the core flow path C (FIG. 1). The annular flow path 76 extends along the engine axis A in a longitudinal direction. The radially inner ring 74 is supported relative to the outer ring 72 by a plurality of circumferentially spaced apart struts 78. A bearing compartment 80 is disposed radially inward of the radially inner ring 74.

The radially inner ring 74 includes a flange 84 having heat shield fastener openings 86 for attaching a heat shield 82 to the inner ring 74. In the illustrated example, the flange 84 is spaced upstream from a downstream end of the inner ring 74.

Figure 4:
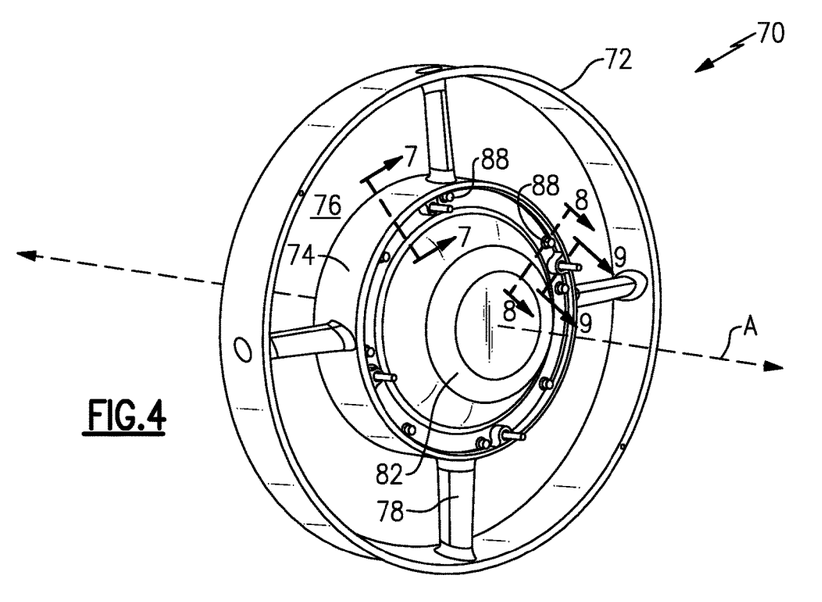
FIG. 4 is a perspective view of the example turbine exhaust case of FIG. 3 with an example heat shield.

As shown in FIGS. 3 and 4, the heat shield 82 attaches to the flange 84 (FIG. 3) on the inner ring 74 with a plurality of heat shield fasteners 88. The heat shield 82 is located radially inward from the inner ring 74 such that a downstream portion of the inner ring 74 separates the heat shield 82 from the annular flow path 76.

Figure 5:
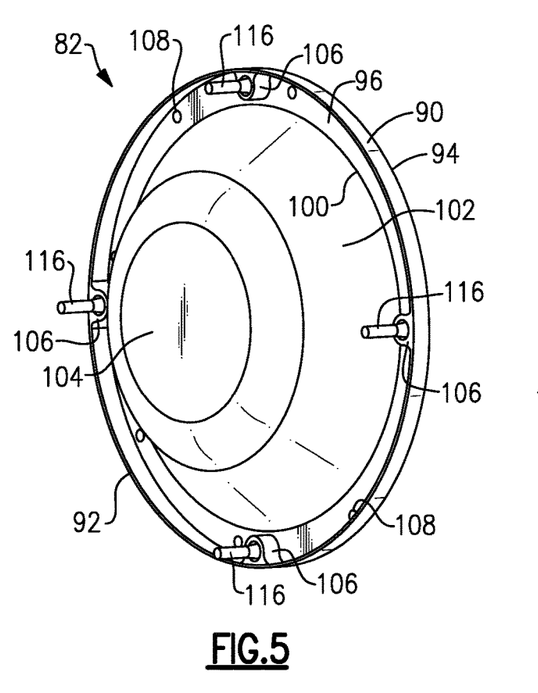
FIG. 5 is a first perspective view of the example heat shield of FIG. 4.
Figure 6:
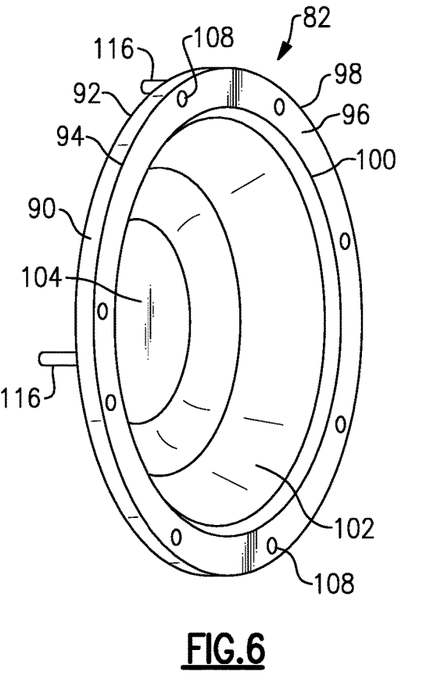
FIG. 6 is a second perspective view of the example heat shield of FIG. 4.

As shown in FIGS. 4-6, the heat shield 82 includes an outer flange 90 extending in an axial direction having a free downstream edge 92 and an upstream edge 94 that is connected to an inner flange 96 at a radially outer edge 98 of the inner flange 96. A radially inner edge 100 of the inner flange 96 is connected to a conical portion 102 that extends radially inward to a plateau 104 that forms a disk in the center of the heat shield 82.

The heat shield 82 also includes a plurality of bosses 106 directly contacting at least one of the outer flange 90 and the inner flange 96. Alternatively, the plurality of bosses 106 are integrally formed with the outer flange 90 and the inner flange 96 such that the plurality of bosses 106 and the heat shield 82 form an integral single piece component, such as through a casting or machining process. The plurality of bosses 106 are circumferentially spaced from a plurality of inner ring fastener openings 108 in the inner flange 96. The inner ring fastener openings 108 accept the heat shield fasteners 88 for securing the heat shield 82 to the inner ring 74. The heat shield 82 is free of openings but for the plurality of inner ring fastener openings 108 in the inner flange 96. This allows the heat shield 82 to protect the bearing compartment 80 from the hot gases passing through the annular flow path 76.

Figure 7:
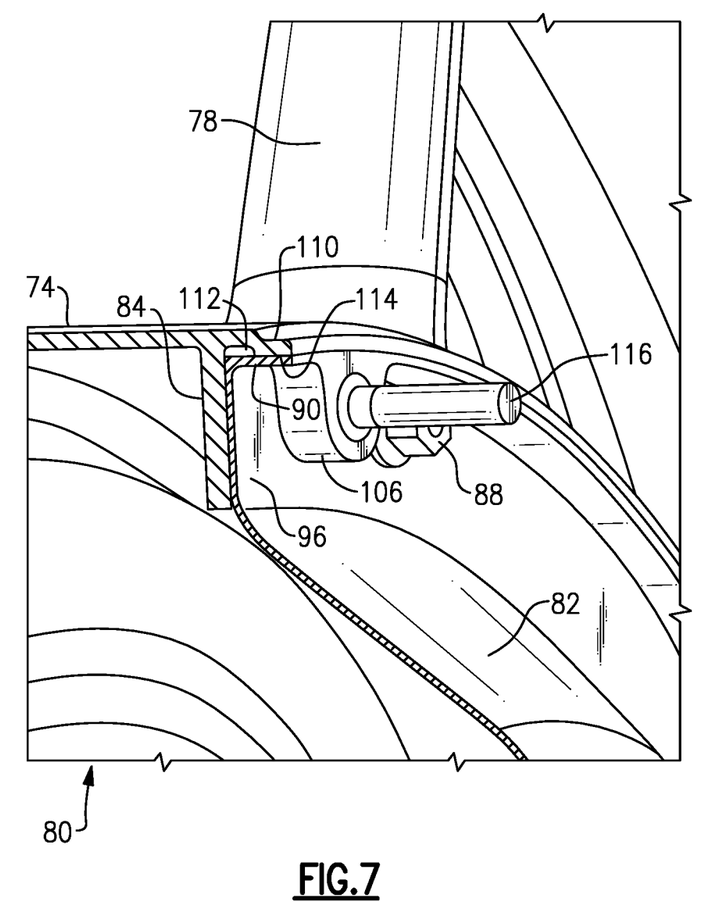
FIG. 7 illustrates a cross-sectional view taken along line 7-7 of FIG. 4.

FIG. 7 illustrates a cross-sectional view taken along line 7-7 of FIG. 4. An axially downstream side of the flange 84 is in direct contact with an axially upstream side of the inner flange 96. As shown in FIG. 7, the flange 84 on the inner ring 74 includes a generally constant axial thickness dimension and is free of openings for accepting any portion of the bosses 106. An axially downstream portion 110 of the inner ring 74, is located radially outward from and axially aligned with the outer flange 90 on the heat shield 82. In the illustrated example, the axially downstream portion 110 of the inner ring 74 includes a recessed portion 112 and a contact surface 114. The recessed portion 112 is spaced from the outer flange 90 and the contact surface 114 is in direct contact with the outer flange 90.

Figure 8:
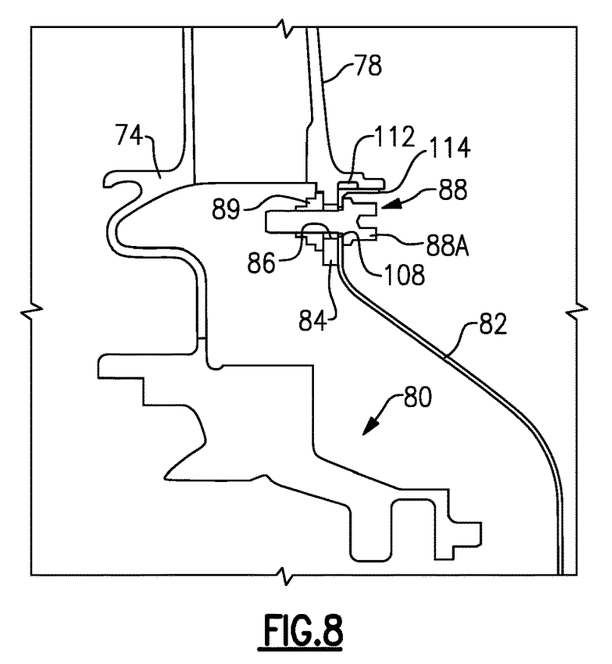
FIG. 8 illustrates a cross-sectional view taken along line 8-8 of FIG. 4.

FIG. 8 illustrates a cross-sectional view taken along line 8-8 of FIG. 4. The inner ring fastener openings 108 in the heat shield 82 are aligned with a corresponding one of the heat shield fastener openings 86 in the flange 84 of the inner ring 74 to accept the heat shield fastener 88. The heat shield fastener 88 includes a head portion 88A that directly contacts the heat shield 82 and a nut portion 89 that engages the heat shield fastener 88 and directly contacts the flange 84. Each of the heat shield fasteners 88 only secure the flange 84 relative to the heat shield 82.

Figure 9:
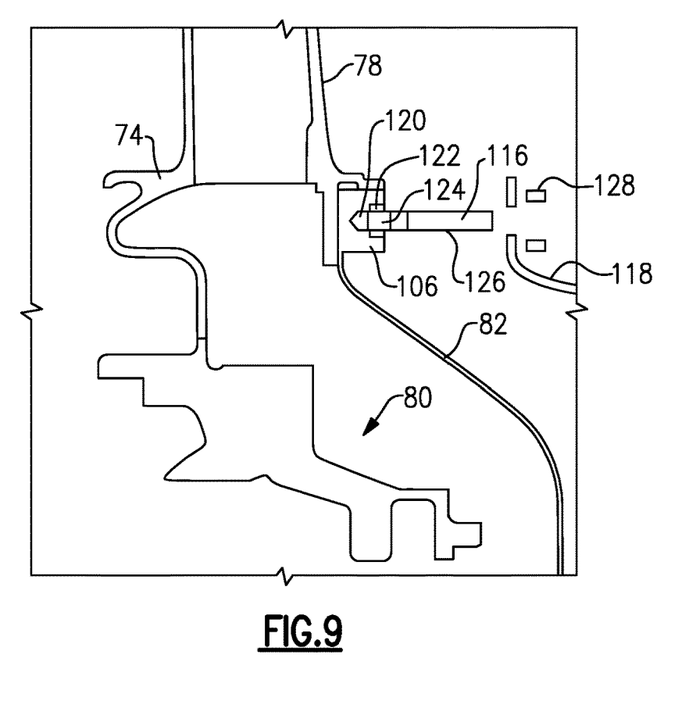
FIG. 9 illustrates a cross-sectional view taken along line 9-9 of FIG. 4.

FIG. 9 illustrates a cross-sectional view taken along line 9-9 of FIG. 4. Each of the bosses 106 support a corresponding guide pin 116 used to locate and attach an engine component 118, such as a turbine exhaust component or a tail cone. The boss 106 includes a central bore 120 having a threaded portion 122 for accepting a complementary first threaded portion 124 on the guide pin 116. The guide pin 116 includes a second threaded portion 126 on an opposite end of the guide pin 116 for engaging an engine component nut 128 to secure the engine component 118 to the heat shield 82 and the inner ring 74. The engine component 118 fits flush against at least one of the boss 106 and the inner ring 74 when installed.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A heat shield for a gas turbine engine comprising:
   a radial heat shield flange extending in a circumferential direction forming a ring;
   a plurality of bosses extending from a first axial side of the radial heat shield flange;
   a plurality of guide pins, wherein one of the plurality of guide pins extends from a corresponding one of the plurality of bosses; and
   an axial heat shield flange extending axially from a radially outer edge of the radial heat shield flange, wherein at least one of the plurality of bosses extends from the radial heat shield flange and the axial heat shield flange.

2. The heat shield of claim 1, wherein the plurality of bosses are formed integrally with the heat shield.

3. The heat shield of claim 1, further comprising a conical portion extending radially inward from a radially inner edge of the radial heat shield flange.

4. The heat shield of claim 3, further comprising a plateau forming a disk located radially inward from the conical portion.

5. The heat shield of claim 1, wherein the radial heat shield flange includes a plurality of exhaust case fastener openings.

6. The heat shield of claim 1, wherein the plurality of guide pins includes a first threaded portion for engaging the corresponding one of the plurality of bosses and a second threaded portion on an opposite end of the guide pin from the first threaded portion.

7. The heat shield of claim 1, wherein the radial heat shield flange includes a second axial side having a radially inner ring contact surface.

8. The heat shield of claim 1, wherein each of the plurality of guide pins extend in an axial direction.

9. A gas turbine engine comprising:
   a core engine configured to rotate an output shaft, and compress and communicate an airflow from a core flow path into a combustor section for expansion through a turbine section; and
   a case comprising:
      a radially outer ring and a radially inner ring connected by a plurality of circumferentially spaced apart struts and defining an annular flow path therebetween;
      the radially inner ring including a radial ring flange extending in a radial direction from the inner ring; and
      a heat shield attached to the radial ring flange, wherein the heat shield includes a radial heat shield flange extending in the radial direction and a plurality of bosses extending from the heat shield for accepting a corresponding one of a plurality of guide pins, an axially extending flange located on a radially outer edge of the radial heat shield flange extends in a direction away from the radial ring flange, and at least one of the plurality of bosses extends from the radial heat shield flange and the axial heat shield flange.

10. The gas turbine engine of claim 9, wherein the axial heat shield flange directly contacts the radially inner ring.

11. The gas turbine engine of claim 9, wherein the radially extending ring flange includes a plurality of inner ring fastener openings that align with a corresponding heat shield fastener opening in the radially extending heat shield flange.

12. The gas turbine engine of claim 11, wherein the radially extending ring flange includes a surface that directly contacts a surface on the radially extending heat shield flange.

13. The gas turbine engine of claim 12, wherein the radially extending ring flange extends in a first radial direction and the radially extending heat shield flange extends in a second radial direction opposite the first radial direction.

14. The gas turbine engine of claim 9, wherein each of the plurality of guide pins are located axially downstream of the radially extending ring flange.

15. The gas turbine engine of claim 9, wherein each of the plurality of guide pins are located on an opposite side of the radially extending heat shield flange from the radially extending ring flange.

* * * * *